Nov. 15, 1955
J. L. PETERSEN
2,723,950
PROCESS FOR REDUCTION OF VAPOR LOSSES
IN BAROMETRIC CONDENSER EVACUATIONS
Filed May 14, 1952
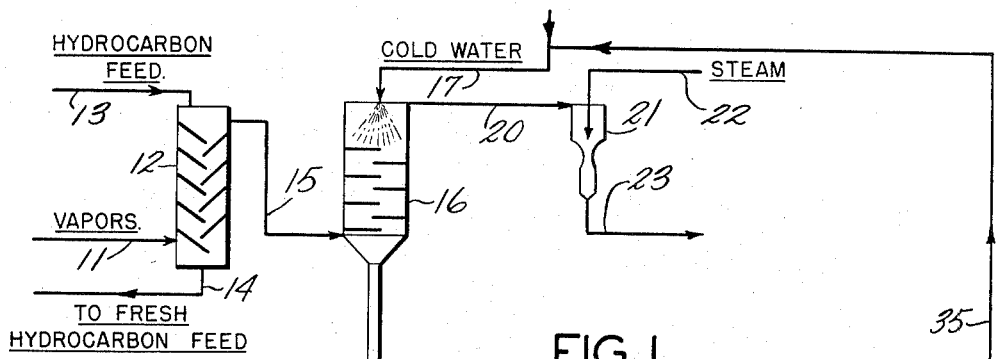
FIG. 1.
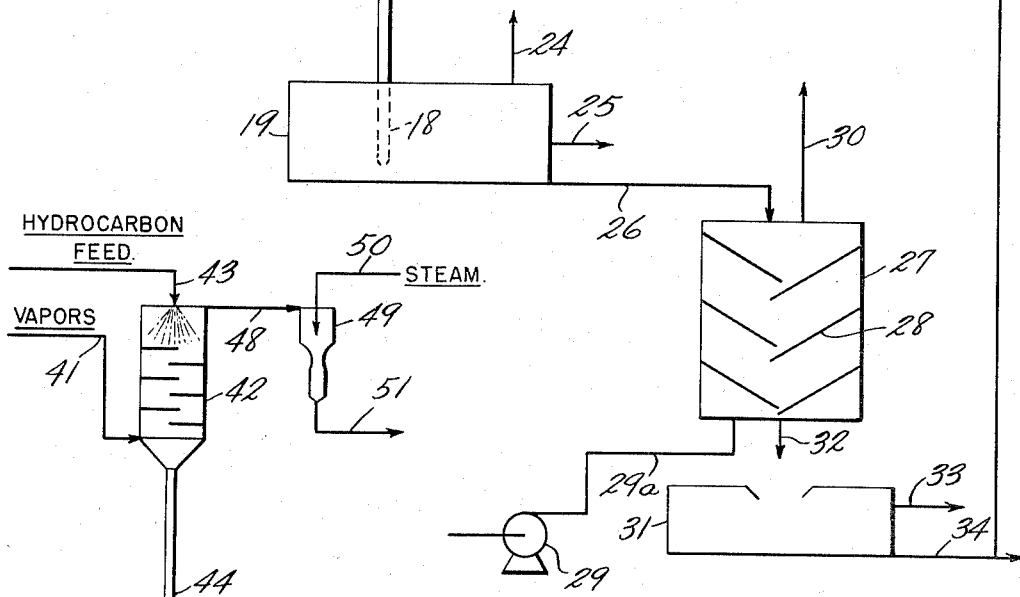
FIG. 2.
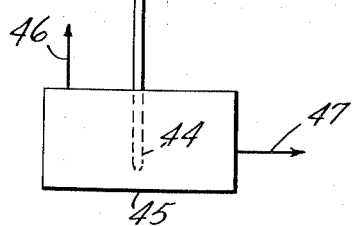
*INVENTOR.*
JOHN L. PETERSEN
BY Campbell, Brumbaugh, Free & Graves
*his* ATTORNEYS.

United States Patent Office 2,723,950
Patented Nov. 15, 1955

2,723,950
PROCESS FOR REDUCTION OF VAPOR LOSSES IN BAROMETRIC CONDENSER EVACUATIONS

John L. Petersen, Euclid, Ohio, assignor to The Standard Oil Company, Cleveland, Ohio, a corporation of Ohio Application May 14, 1952, Serial No. 287,785

1 Claim. (Cl. 196—93)

The present invention relates to improvements in recovering vapors from remote and inaccessible places. In one of its modifications, the present invention relates to an improvement in the process of recovering hydrocarbon or oil vapors from a spent fixed catalyst bed unit before the catalyst is regenerated.

Although the invention is applicable to any system in which desirable or undesirable vapors are removed by vacuum or blowing from inaccessible places, such as within enlarged vessels, pipe stills, lengthy conduits, small and tortuous channels or tunnels, etc., one of the most common examples of such system is in the fixed bed catalytic conversion systems in the treatment of hydrocarbon oils where residual vapors of hydrocarbons which have been undergoing catalytic conversion must be substantially removed from entrapment and association with the stationary beds of solid catalytic material before even a purging charge of superheated steam is passed through and where residual gases employed in regeneration of the catalytic material must be purged from the chamber before hydrocarbons for conversion are readmitted. The improvement of the present invention can therefore best be illustrated as applied to a particular process, such as the purging and recovery of vapors from a fixed bed catalytic chamber.

According to a conventional method of recovering hydrocarbon vapors from such a unit, the hydrocarbon or oil vapors are vacuum-removed from the catalyst case with the aid of a barometric condenser which may be aided by a steam jet ejector and, toward the end of the purging stage, with a sweeping stream of steam. The vapors move into the barometric condenser and there they are intimately mixed with a charge of cold water which absorbs and condenses the vapors. The condensed oil is then passed, along with the water, to a seal or vent tank where the oil and water divide generally into two layers. The upper layer comprising oil is skimmed off and returned to the main cracking oil reservoir. The lower layer, comprising water and some unseparated oil, is passed to a cooling tower where the oil either evaporates or is collected in a cold water sump. The oil-water mixture which separates at the top of the sump is sent to a sewer system, where the oil is separated and recycled to the fresh hydrocarbon feed stock. The cold essentially oil-free water is returned from the bottom of the sump to the barometric condenser to act further as an absorbing and condensing medium.

However, in this conventional process, much of the oil vapor is lost through evaporation in the cooling tower and it is an object of this invention to diminish such loss. For example, it is estimated that 55 barrels per day of light, distillate range, oil evaporate from the cooling tower when the catalytic cracking unit is charged with fresh feed at the rate of approximately 15,000 barrels per day.

I have found that the amount of oil lost in the cooling tower is greately reduced if, after the oil vapors are removed from the catalyst case, they are brought into intimate contact with a condensing and absorbing charge of cold hydrocarbon either in addition to or in place of the charge of cold water in the barometric condenser.

In one preferred embodiment of my invention, the removed oil vapors are brought into contact with cold hydrocarbon before the vapors are passed to the barometric condenser.

In another preferred embodiment of my invention, the removed oil vapors are passed directly to the barometric condenser and there contacted with the cold hydrocarbon charge.

A further advantage residing in the method of my invention is that the loads on the sewer and separator systems are greatly diminished.

Moreover, my novel method has the advantage that it reduces fire hazard at the cooling tower where the oily water ordinarily present creates such danger. By decreasing the amount of oil present in the tower this risk is lessened.

Another advantage is the fact that the hot vapors from the catalyst cases release heat to the cold hydrocarbon feed stock thereby reducing the fuel requirements in the catalytic furnace.

Other objects and advantages of the method of my invention will appear as it is described in detail below.

Figure 1 is a flow chart showing one preferred embodiment of the invention applied to a conventional refinery method for removing hydrocarbon vapors from catalytic cracking cases.

Figure 2 is a flow chart of another embodiment of the present invention.

In accordance with the present invention, I bring the residual hydrocarbon vapors from the catalytic cracking cases into intimate contact with a cold charge of hydrocarbon stock so as to remove as much hydrocarbon vapor as possible. By doing this, I diminish the amount of hydrocarbon vapor that is mixed with the water in the conventional barometric condenser, thereby decreasing the loss of oil in the cooling tower as described above.

Referring now to Figure 1, 11 is a line carrying residual hydrocarbon vapors (such as from a catalytic cracking case of the Houdry type) to contacting tower 12, where the vapors are forced through a body of hydrocarbon charge. The pipe 13 admits the unheated hydrocarbon feed into the tower 12 and recycle line 14 carries the mixture of charge feed and condensed vapors from the contacting tank 12 to a reservoir or to the main line of fresh hydrocarbon feed. The pipe 15 which connects the tank 12 and therethrough the catalyst case with the barometric condenser 16 allows those vapors not condensed and absorbed by the hydrocarbon feed to enter the condenser 16. The contacting tower 12 may be any conventional tower wherein the cold feed is sprayed, or otherwise intimately mixed with the vapors coming from the catalytic cracker, and provided with a baffling system to facilitate the mixing of the two countercurrent streams.

Cold water (which acts as a condensing and absorbing medium) enters the barometric condenser 16 by way of line 17 and pulls a vacuum in the condenser 16 through the force of an extended column of water in an outlet standpipe 18. Vapors and water pass counter-current to each other in the condenser 16. Mixing is facilitated by a series of baffles. Uncondensed vapors leave the condenser 16 at the top thereof via line 20. Any conventional means for distributing the water, entering through line 17, over the cross-section of the condenser 16 may be employed, such as a distributing plate or spray.

A seal or vent tank 19, which is vented to the atmosphere at 24 so as to maintain atmospheric pressure within the tank, is located below the condenser 16 and receives the open end of the standpipe 18 which extends downwardly into the tank 19 below the level of liquid therein. The tank 19 is located at a level below the level of the condenser 16 to provide the column of water and condensed hydrocarbon vapors in the pipe 18 above the level of the liquid in the tank 19. Since the condenser is substantially pressure tight, a vacuum will be created and maintained in the condenser 16 in a fashion similar to a water barometer.

Connected to the barometric condenser 16 by the line 20 is a steam jet 21 which pumps non-condensible vapors from condenser 16 and helps to maintain a vacuum in the entire system. High velocity steam enters the jet 21 by way of line 22 and passes out through line 23, which may discharge into other small barometric condensers or may be vented to the atmosphere.

The tank 19 has an outlet 25 for removing oil which separates into a separate upper layer in the tank. The seal tank 19 is further connected to a cooling tower 27 by means of a line 26. Water from tank 19 falls through cooling tower 27 over a series of baffles 28. Air is forced through the tower, countercurrent to the water, by means of a blower or fan 29 connected to tower 27 by line 29a. The forced air leaves the top of the tower through any suitable vent 30. Cooled water from tower 27 falls into a cold water sump 31 through line 32. A line 33 carries any remaining oil mixed with water from the cold water sump 31 to the sewer and a conventional separating system. A line 34 is an outlet for the cold water from the sump 31 and may connect through line 35 with the line 17 which feeds cold water to the barometric condenser 16.

In operation the hydrocarbon oil vapors removed from the catalytic cracking chamber are pulled by the vacuum in the barometric condenser 16 into the contacting tower 12. They meet and intermingle intimately in the tower 12 with a stream of unheated hydrocarbon stock entering the tank 12 through the line 13. The vapors in being condensed by and absorbed in the feed stock give up heat to the hydrocarbon stock and then pass with the heated feed stock from the tower 12 by way of line 14 and are either charged to other conversion chambers or are passed to a reservoir of fresh hydrocarbon stock. Where the mixed condensed vapors and hydrocarbon stock are to be fed to the conversion chamber, the heat from the vapors is especially useful in the preheating of the hydrocarbon feed to the conversion process. Those vapors which are not condensed and absorbed in the tower 12 are pulled by the vacuum through line 15 into the barometric condenser 16 wherein they are intimately mixed with a charge of cold water entering the condenser at inlet 17, which charge serves to condense and absorb further the evacuated oil vapors. Both the water and condensed vapors then pass from the barometric condenser 16 by way of the line 18 to the seal tank 19. The steam entering the jet 21 through line 22 is generally led to an after condenser, as is conventional in the art, by way of line 23. The steam passing through the steam ejector 21 augments the vacuum pulled by the barometric condenser 16.

The liquids collected in tank 19 divide generally into two layers, the upper layer comprising oil and the lower layer comprising a mixture of oil and water. Any gases and vapors that may collect in the seal tank are vented to the atmosphere by way of outlet 24. The upper layer of oil is removed at outlet 25 and may be purified and recycled to the fresh hydrocarbon feed stock or to the feed line leading to the catalytic cracking chamber. The lower layer comprising water and some unseparated oil is passed through line 26 to the cooling tower 27 and then falls to the cold water sump 31. In this sump there is further separation of the water and oil. The top layer comprises oil which is removed at outlet 33 and passed to an oil sewer system wherein the oil is further purified and recycled to the fresh hydrocarbon stock or to a feed line leading to the catalytic cracking chamber. The water in the sump 31, which is now cold, since it has been treated in the cooling tower 27, is recycled by way of lines 34 and 17 to the barometric condenser 16.

Another preferred embodiment of my invention is to lead the oil vapors directly from the catalyst case to a barometric condenser wherein they are intimately mixed with a cold hydrocarbon charge as shown in Figure 2. In addition to absorbing and condensing the oil vapors from the catalyst case, the hydrocarbon charge pulls the vacuum in the condenser. In other words, the tower 12 may be a barometric condenser in which a column of the hydrocarbon feed also pulls a portion of the vacuum in the catalyst case as described hereinafter.

With particular reference to Figure 2, a stream 41 of hydrocarbon or oil vapors from a catalytic cracking case is led directly into a barometric condenser 42. Cold hydrocarbon feed stock enters the condenser 42 through inlet 43 and intimately mixes with the vapors in the condenser so as to absorb and condense them. Mixing is facilitated by the use of means similar to those described in connection with Figure 1, and a similar distributing plate may also be employed. Both the condensed and absorbed hydrocarbon vapors and the hydrocarbon feed, then pass from the condenser 42 by means of pipe 44 to a tank 45, which is vented to the atmosphere at outlet 46. The pipe 44 extends down into the tank 45 and below the level of liquid therein. The level of the condenser 42 is sufficiently above the level of liquid in the tank 45 so that the column of liquid in the pipe 44 will create and maintain a vacuum in the condenser 42. The liquids in the tank 45 are recycled by way of line 47 to the fresh hydrocarbon feed stock or to a feed line leading to the catalytic cracking chamber. Part of the vacuum in the system is pulled by the hydrocarbon stock entering the condenser 42 at inlet 43. In addition, a steam jet 49, similar to that shown in Figure 1, is connected to the condenser 42 by passage 48 and assists in creating and maintaining a vacuum in the entire system. Hot steam enters the jet 49 through line 50 and then passes by way of line 51 to other small barometric condensers or may be vented to the atmosphere. A water barometric condenser similar to 16 may be inserted between the condenser 42 and the jet 49.

Although the invention has been described with special reference to the purge of a fixed bed catalytic conversion chamber, it is clear that it could be applied to any system in which residual vapors are removed by blowing or by vacuum, particularly where a barometric condenser is employed. Various cold liquids could be used in place of hydrocarbon oil stock to condense and absorb the issuing vapors and will preferably be the same material in liquid state as the issuing vapor it is desired to absorb or, if a different material, will be one from which the absorbed vapor is easily recovered.

In view of the foregoing disclosure, variations and modifications thereof will be apparent to those skilled in the art. The invention contemplates all such variations and modifications broadly except as do not come within the scope of the appended claim.

I claim:

In a method for recovering hydrocarbon vapors from apparatus in which hydrocarbons are treated including the steps of evacuating the vapors from the apparatus and passing them to a barometric condenser wherein the vapors are condensed and absorbed, the step of bringing said vapors which consist essentially of hydrocarbon vapors into intimate contact with a charge of cold hydrocarbon within the barometric condenser.

References Cited in the file of this patent

UNITED STATES PATENTS

| Number | Name | Date |
|---|---|---|
| 1,847,625 | Ragatz | Mar. 1, 1932 |
| 1,848,051 | Subkow | Mar. 1, 1932 |
| 2,002,731 | Coubrough | May 28, 1935 |
| 2,050,329 | Johnson | Aug. 11, 1936 |
| 2,095,265 | Pew | Oct. 12, 1937 |
| 2,121,218 | Erter | June 21, 1938 |
| 2,152,155 | Rude | Mar. 28, 1939 |